United States Patent [19]

Bold

[11] Patent Number: 5,051,221
[45] Date of Patent: Sep. 24, 1991

[54] METHOD FOR THE MANUFACTURE OF A MOIST MIXTURE FROM PLASTER OF PARIS AND FIBRES

[75] Inventor: Jörg L. Bold, Kaiserslautern, Fed. Rep. of Germany

[73] Assignee: Wurtex Maschinenbau Hofmann GmbH & Co, Fed. Rep. of Germany

[21] Appl. No.: 482,482

[22] Filed: Feb. 21, 1990

[30] Foreign Application Priority Data

Feb. 26, 1989 [DE] Fed. Rep. of Germany ....... 3906009

[51] Int. Cl.$^5$ .............................................. B28C 5/40
[52] U.S. Cl. .................................... 264/115; 106/780; 106/784; 156/39; 264/109; 264/122; 264/333
[58] Field of Search ............... 106/711, 780, 784, 772; 156/39; 264/333, 122, 115, 116, 109, 40.1, 40.4, 40.7

[56] References Cited

U.S. PATENT DOCUMENTS

| | | | |
|---|---|---|---|
| 3,062,670 | 11/1962 | Marzocchi et al. | 106/711 |
| 3,390,003 | 6/1968 | Cooper | 106/780 |
| 3,737,265 | 6/1973 | Schafer et al. | 425/140 |
| 3,809,566 | 5/1974 | Revord | 425/371 X |
| 3,972,972 | 8/1976 | Yano et al. | 264/117 |
| 4,328,178 | 5/1982 | Kossatz | 264/69 |
| 4,533,434 | 8/1985 | Yoshioka et al. | 162/124 |
| 4,840,688 | 6/1989 | Vogt | 156/39 |
| 4,902,348 | 2/1990 | Kossatz et al. | 106/780 |
| 4,942,003 | 7/1990 | Bold | 264/40.4 |
| 4,965,031 | 10/1990 | Conroy | 264/122 |

FOREIGN PATENT DOCUMENTS

1261125 9/1989 Canada .................................. 156/39

Primary Examiner—Mary Lynn Theisen
Attorney, Agent, or Firm—Fred Philpitt

[57] ABSTRACT

A moist mixture of plaster of Paris and fibres is produced due to the fact that before mixing with the fibres, a considerable quantity of water is supplied to the plaster of Paris, which leads to a moisture content of the plaster of Paris of up to 22% by weight (with respect to the dry substance). With this moisture content, the plaster of Paris is indeed no longer stable in storage in an unrestricted manner; however, it remains free from lumps for a certain processing time and can be mixed with the fibres in a high speed, continuous mixer. The moist mixture of plaster of Paris and fibres obtained in this way is intended as an initial product in the manufacture of fibre-reinforced moulded plaster bodies, in particular of fibre-reinforced plaster boards. It contains the water necessary fort setting in the most homogeneous distribution and in a precise dose (FIG. 1).

17 Claims, 2 Drawing Sheets

TO FURTHER PROCESSING

METHOD FOR THE MANUFACTURE OF A MOIST MIXTURE FROM PLASTER OF PARIS AND FIBRES

The invention relates to a method for the manufacture of a moist mixture from plaster of Paris and fibres as an initial product in the manufacture of fibre-reinforced moulded plaster bodies, in particular of fibre-reinforced plaster boards, in which fluid plaster of Paris, fibres and water are mixed homogeneously.

In the manufacture of fibre-reinforced moulded plaster bodies, the components fibres and plaster of Paris and possibly additives must be mixed and moistened uniformly with water. As long as the mixture can be produced with a great excess of water, various known mixing methods can be used, for example the simultaneous spraying of plaster paste and fibres onto a support. On the other hand, if the water content should be in the vicinity of that theoretically necessary for setting the plaster, during the production of the mixture, the water must be added in a finely distributed form.

One method of the aforementioned type is known from U.S. Pat. No. 3,737,265. In the latter, a pre-mixed mass of plaster and fibres is sprayed with water during the spreading to form a layer of material. However, it has been found that this method does not produce uniform moistening. For this reason, the method was modified in practice, as described in DE-AS 27 51 473. According to this prior art, the layer of material which is spread out is saturated with water; the excess quantity of water is then squeezed out during compression.

EP-OS 00 19 207 describes another arrangement for introducing the water into the mixture. In the latter, a porous support material, for example paper fibres, is saturated with the entire quantity of water and then mixed with the dry plaster of Paris. The mixture obtained in this way is then compressed; the water is drawn out of the support material by the plaster. This method has proved successful in the manufacture of plaster-bonded chipboards; however, for the manufacture of plaster boards reinforced with paper fibres, the necessary quantity of water can only be introduced with difficulty into or onto the fibres.

DE-OS 32 16 886 describes a method in which a mixture of plaster and paper fibres is swirled in a mixer with the necessary quantity of water. In this case it is difficult to distribute the water sufficiently finely in the mixture. When introducing the water, local excess concentrations may occur, which leads to inhomogeneities or lumps in the mixture. The latter can no longer be broken up and are visible on the surface of the moulded body.

As a way out of these difficulties, in practice (a printed prior publication is not available) a method was used, in which the water is introduced into the preliminary mixture in the form of small pieces of ice or snow. This method is not suitable for industrial practice, where the plaster, as a rule coming directly from the plaster factory, is relatively hot as it enters the process.

It is the object of the present invention to provide a method of the aforementioned type so that with the least possible addition of water, without the formation of lumps and inhomogeneities, high homogeneity of the mixture is achieved, which during further processing leads to high quality fibre-reinforced moulded plaster bodies.

This object is achieved according to the invention due to the fact that before mixing with the fibres, a quantity of water is added to the plaster of Paris, which leads to a moisture content of between 5 and 22% (numerical data in % by weight; dry substance = 100%).

The invention is based on the surprising finding that plaster of Paris can be mixed with large quantities of water without becoming lumpy. In this case it is known per se to add the water in the order of magnitude of 5% to plaster of Paris. In this case, the plaster of Paris has uniform setting properties; the water requirement is reduced when making it into a fluid paste. However, with this moisture content, the plaster of Paris does not set in the form of the dihydrate. After mixing, it can thus be stored for a relatively long time. This process referred to as "artificial aging" is frequently used in the manufacture of cast moulded bodies from pure plaster.

On the other hand, if one adds more than 5% water, as proposed by the invention, then a part thereof is used for setting. However, as the invention has recognised, the process takes place so slowly that a relatively great amount of time still remains for further-processing. The plaster moistened within the limits according to the invention solidifies under slight pressure, so that it retains the shape imparted to it with respect to its own weight and slight mechanical stress; however, under a greater load it disintegrates again. As already mentioned, a mixture of this type can no longer be stored for a long time without limitations. The critical time reduces with the addition of water.

If the moisture content of the plaster of Paris is adjusted to approximately 18%, in most cases particularly favourable results occur. In this case, the quantity of water is generally high enough for setting to occur; nevertheless, the processing time of the pre-moistened plaster of Paris remains within reasonable orders of magnitude.

Mixing of plaster of Paris and water should take place continuously in a high-speed, low-volume mixer. Due to this, local excess concentrations of water, which could lead for example to lumps, are avoided.

The pre-moistened plaster of Paris should generally be mixed with the reinforcing fibres within five minutes at the maximum. The bonding capacity of the plaster of Paris is virtually completely maintained within this period of time.

The mixing of the pre-moistened plaster of Paris with the fibres preferably takes place in two stages: in a first, continuous mixer having a somewhat larger volume and operating more slowly, "macroscopic" preliminary mixing takes place; the final homogeneous mixing takes place in a second, continuous, higher speed mixer of smaller volume.

Further additives can be added to the pre-moistened plaster of Paris, together with the strengthening fibres.

In this case, it can be recommended that before mixing with the pre-moistened plaster of Paris, the additives are pre-moistened in turn. In this way, additional water can be introduced into the final mixture.

Also, the mixing of the pre-moistened plaster of Paris with the fibres should take place continuously in a high-speed, low-volume mixer. The use of such a mixer is based on the considerations already discussed above: due to this, local inhomogeneities are already avoided at the beginning.

If, in certain cases, the addition of water to the plaster of Paris possible according to the findings of the invention is inadequate, in a supplementary manner, the fibres may be added with a moisture content of up to 200%. In this respect, the teaching according to the invention may thus be combined with the prior art according to EP-OS 00 19 207. However, according to the invention, with this method, the necessary quantities of water are added both to the plaster of Paris as well as to the fibres in separate operations. This makes it possible to adapt the mixing or moistening process in an optimum manner to the respective dry substance.

The fibres are preferably added with a moisture content of approximately 150%.

One recipe, according to which it is possible to work in a particularly promising manner, consists in that
a) 15 parts by weight dry fibres are given a moisture content of 150%;
b) 85 parts by weight dry plaster are given a moisture content of 18% and
the substances pre-moistened in this way are then mixed.

If the fibres are produced from waste paper (or a similar, absorbent substance), then according to a particular feature of the invention, it is quite especially useful if the moistening of the waste paper takes place before shredding.

In this case, the size is no longer effective; the fibres are completely separated and only shortened slightly. In addition the fibre is not tangled. Whereas, with the known dry breaking-up of the fibres, there is a danger due to metal parts, which lead to smouldering and the risk of a dust explosion, such difficulties do not occur in the case of moist breaking-up. In addition, the energy requirement in the production of moist fibres is considerably lower, since the force of the size does not need to be broken. Finally, due to the addition of auxiliary agents to the fibres (for example starch solution), the adhesion between the plaster and fibre can be improved. As a whole, the limits of the fibre content (12 to 20% by weight) in the case of moist breaking-up, are very much wider than in the case of dry breaking-up, which provides greater variability in carrying out the method and in the end products achieved therefrom.

If one chooses the above-described method of moist breaking-up of the fibres, then it is recommended that the moistening of the waste paper takes place after preliminary reduction to approximately the size of postage stamps.

Before further-processing, the reaction time of the water should amount to at least one minute. This can be achieved either by an appropriate length of the conveyor belt, on which the moistening takes place, or by intermediate storage.

The supply of water to the respective dry substances at the time of moistening should be controlled by a control circuit, which monitors the quantity of dry substance supplied per unit time and doses the water according to the pre-set, desired moisture content.

Instead of water, slurries containing fibres may also be used for moistening the waste paper, such as occur as waste products in the production of cellulose and other industrial processes.

Embodiments of the invention are described in detail hereafter with reference to the drawings, in which.

Figure 1:
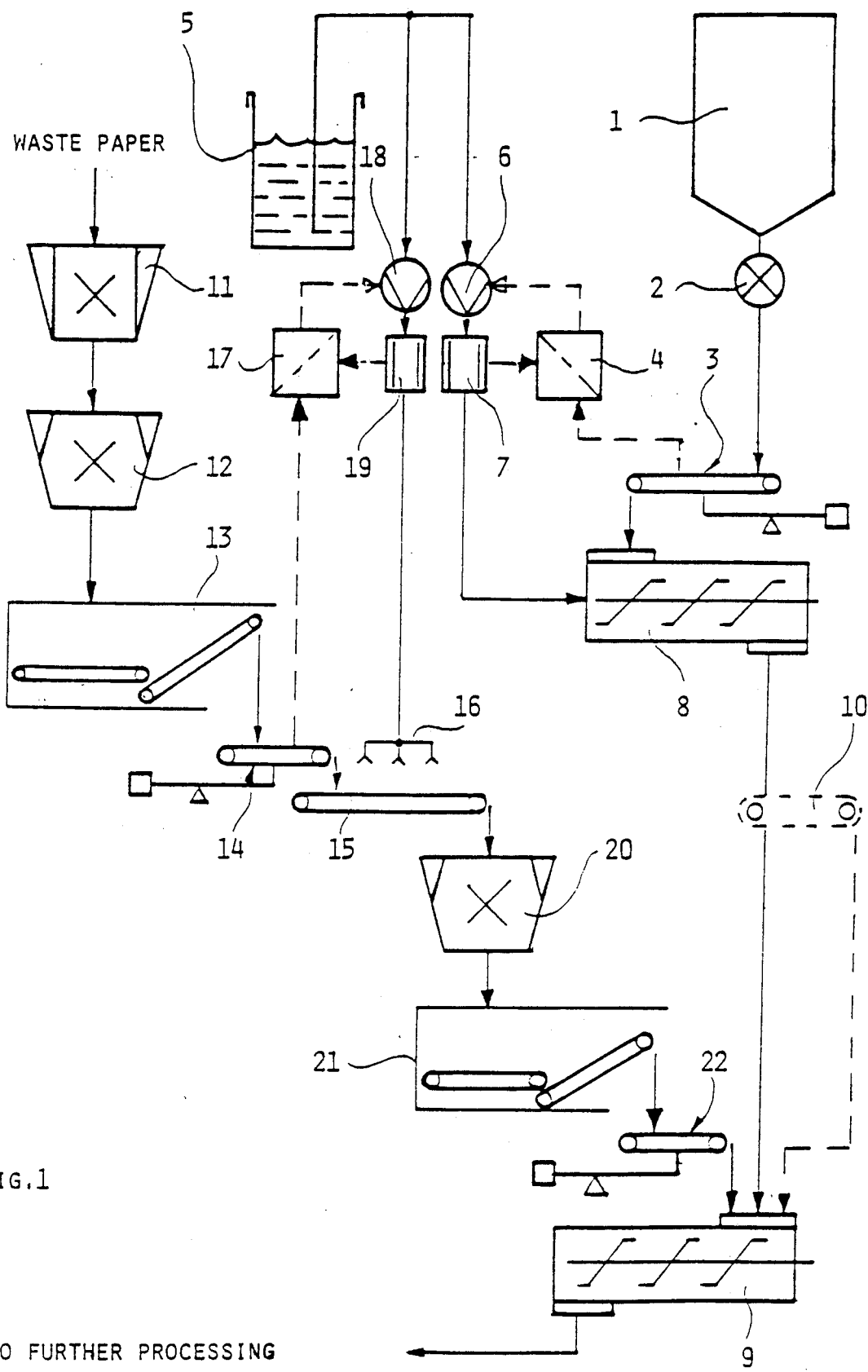
FIG. 1 shows diagrammatically an installation for the manufacture of a moist mixture from plaster of Paris and waste paper fibres, which may serve as an initial product in the manufacture of fibre-reinforced plaster boards.

First of all, reference is made to FIG. 1. In this Figure, a storage container for plaster of Paris bears the reference numeral 1. The plaster of Paris is supplied by way of a valve 2 to a conveyor type weigher 3. The conveyor type weigher 3 ascertains the quantity of plaster of Paris supplied per unit time; this quantity serves as an input variable for a control unit 4, which controls the addition of water in a certain percentage.

For this purpose, water, which is located in a storage container 5, is introduced by a pump 6 through a flowmeter 7 into a high-speed, continuous mixer 8 and is sprayed therein. In this way it is mixed continuously in the finest form with the plaster of Paris dropping from the conveyor type weigher 3 into the mixer 8.

The addition of water to the mixer 8 is in this case controlled in the following manner:

From the quantity of plaster of Paris supplied per unit time and determined by the conveyor type weigher 3, the control unit 4 calculates the reference value of a quantity of water to be added per unit time, according to a moisture content of the mixture to be produced, which is fed in previously. The flowmeter 7 determines the respective actual value of the quantity of water added per unit time; the control unit 4 compares this actual value with the reference value and brings both into conformity by controlling the pump 6. In this way it is ensured that the same proportion of plaster of Paris and water always occurs in the mixer 8.

Due to the type of construction of the high-speed, continuous and low-volume mixer 8, it is ensured that no local excess concentrations of water occur in the mixture of plaster of Paris and water produced in the mixer 8, which could lead to the formation of lumps.

The moist mixture of plaster of Paris and water leaves the mixer 8 possibly in free fall and enters a further mixer 9, in which mixing with moist waste paper fibres takes place in a manner to be described hereafter. Alternatively, the moist mixture of plaster of Paris and water can also be introduced by a conveyor belt 10 (shown in broken line in the drawing) into the mixer 9.

The production of the pre-moistened waste paper fibres takes place in the following manner:

The waste paper delivered in bales is reduced in size in a pre-shredder 11 to pieces of the approximate size DIN A 4. A further reduction to approximately the size of postage stamps takes place in a subsequent hammer mill 12. The waste paper reduced in size in this way but not yet shredded, is stored for an intermediate period in a small dosing bunker 13. The pieces are then discharged onto a conveyor type weigher 14, which once again monitors the quantity of pieces discharged per unit time. From the conveyor type weigher 14, the pieces pass to a conveyor belt 15, where they are sprayed with an accurately controlled quantity of water through nozzles 16. The length of the conveyor belt is such that the water may act for at least one minute; intermediate storage of the pieces may also occur if necessary in order to achieve a suitable reaction time.

The control of the quantity of water takes place in a way which corresponds to that in the production of the mixture of plaster of Paris and water. The quantity of paper pieces per unit time ascertained by the conveyor type weigher 14 is sent to a control unit 17 as a control variable. From this the control unit 17 calculates, according to a given, desired degree of moisture, the reference value for the quantity of water to be sprayed per unit time by way of the nozzles 16. The water is likewise taken from the storage container 5. This takes place by means of a pump 18, which supplies the water by way of a flowmeter 19 to the nozzles 16. If the control unit 17 establishes that the actual value of the quantity of water sprayed per unit time and ascertained by the flowmeter 19 does not correspond to the reference value, then it controls the output of the pump 18 in such a way that the actual value is made to equal the reference value. In this way it is ensured that the paper pieces located on the conveyor belt 15 are always supplied with a corresponding quantity of water.

The moistened pieces drop from the conveyor belt 15 into a disc mill 20 without screens, in which the actual shredding to the final size desired now takes place. In this case it is of great significance that this shredding only takes place after moistening of the paper pieces.

The moist waste paper fibres are received in a small intermediate dosing bunker 21 and discharged from there onto a further conveyor type weigher 22. The conveyor type weigher 22, from which the moist paper fibres drop into the mixer 9, doses the addition of fibres according to the mixture of plaster of Paris and water supplied to the mixer per unit time.

The mixer 9 is of a similar construction to the mixer 8; that is to say it has a small volume, operates continuously and by the throughflow method. The moist mixture of plaster of Paris and water leaving it is highly homogeneous and contains an accurately adjusted quantity of water, so that it is suitable in an optimum manner for further processing into fibre-reinforced moulded plaster parts, in particular plaster boards.

In a preferred embodiment which is not shown in the drawings, the moist paper fibres are mixed with the premoistened plaster of Paris in two stages: in a first continuous mixer, which with a somewhat larger volume operates somewhat more slowly, a "macroscopic preliminary mixing" is carried out; the final homogeneity of the mixture is achieved in a second, continuous mixer, which operates more quickly with a smaller volume.

Figure 2:
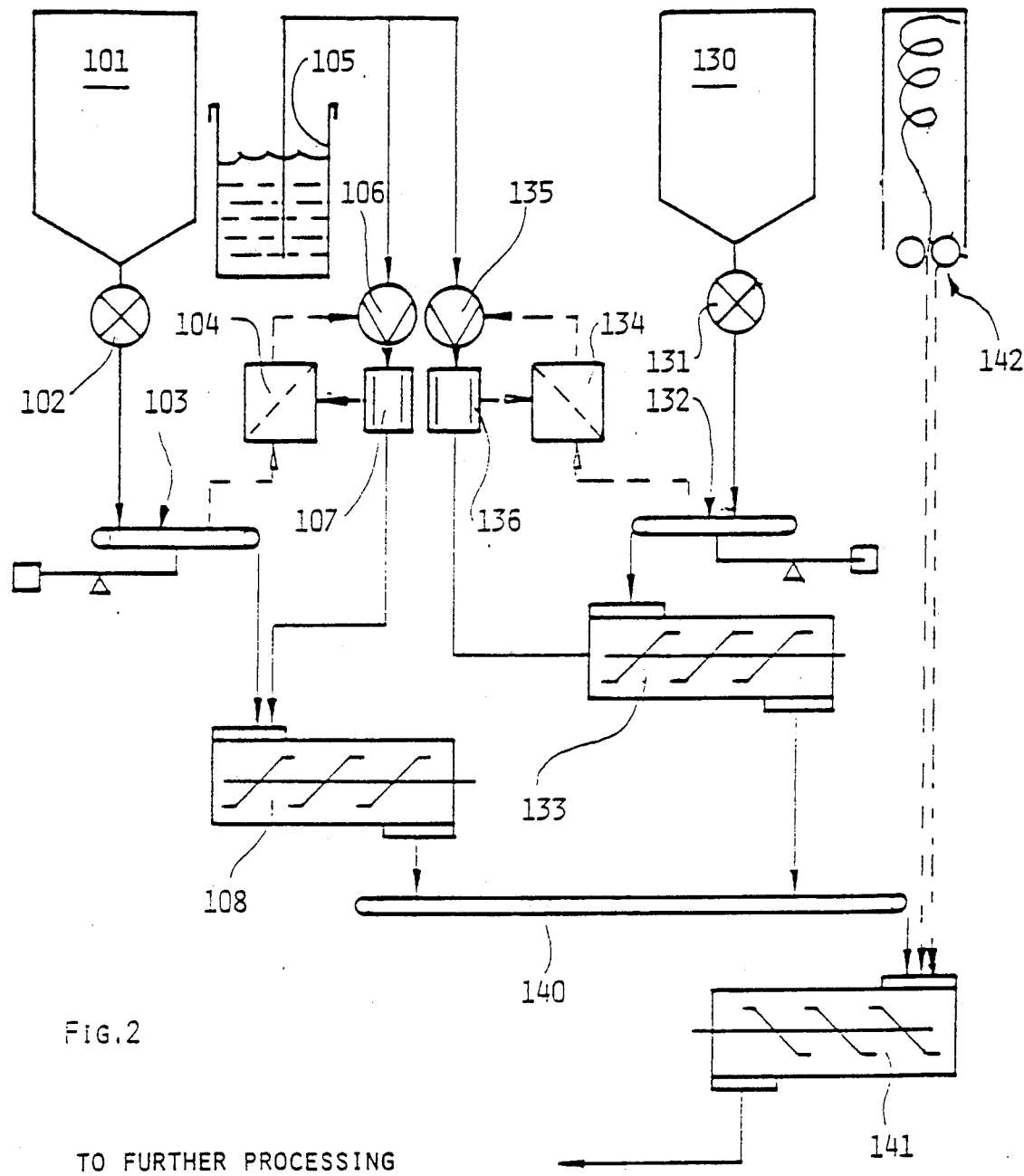
FIG. 2 shows diagrammatically in a similar manner an installation for the manufacture of a moist mixture of plaster of Paris and glass fibres, which is suitable as an initial product for a similar moulded body.

The installation illustrated diagrammatically in FIG. 2 serves for the production of a moist mixture of plaster of Paris and glass fibres. It is similar in large areas to the installation described above with reference to FIG. 1; corresponding parts are therefore given the same reference numeral, plus 100.

The production of the mixture of plaster of Paris and water takes place as in the above-described, first embodiment. The plaster of Paris located in a storage container 101 is supplied by way of a valve 102 to a conveyor type weigher 103. From the latter it drops into a small-volume, high-speed, continuous mixer 108. Water is also supplied to this mixer 108 in a controlled manner. For this purpose, water is removed from the storage container 105 by a pump 106 and supplied to the mixer 108 by way of a flowmeter 107. From the quantity of plaster of Paris per unit time ascertained by the conveyor type weigher 103, a control unit 104 calculates the reference value of the quantity of water to be supplied per unit time to the mixer 108. It compares the reference value with the actual value ascertained by the flowmeter 107 and equates the latter with the former by influencing the output of the pump 106.

Connected in parallel with the branch of the installation just described, in which the plaster of Paris is mixed with water, is a substantially identical branch, in which solid additives are added to defined quantities of water. This further branch comprises a storage container 130, from which the solid additives can be delivered by way of a valve 131 to a conveyor type weigher 132. The conveyor type weigher 132 ascertains the quantity of solid additives supplied per unit time to a high-speed, continuous mixer 133. A control unit 134 controls the removal of water from the storage container 105 by a pump 135 and by way of a flowmeter 136, as was already described above for the control unit 104. In the mixer 133, the solid additives are mixed homogeneously with the water supplied by the pump 135. The mixture of additives and water is delivered to a conveyor belt 140, which also receives the mixture of plaster of Paris and water from the mixer 108.

The entire contents of the conveyor belt 140 are supplied to a further, continuous, high-speed mixer 141, where the mixing with glass fibres takes place. The glass fibres, which are supplied in the form of rovings, are reduced by a chopper 142 to the desired fibre tuft length (for example approximately 12 mm). The fibre tufts drop directly into the mixer 141. Metering of the addition of fibres to the mixer 141 takes place by way of the rotary speed of the chopper or by way of the yarn length of the rovings.

At the outlet of the mixer 141, a satisfactorily homogenized, moist mixture of plaster of Paris, additives and glass fibres is obtained, which can then be supplied for further processing to form fibre-reinforced moulded plaster bodies.

Some numerical values for particularly favourable processes are given hereafter. All the weights are given as percentage by weight. The data for the moisture content relate to the corresponding dry substance (dry substance =100%): the installation described with reference to FIG. 1 is preferably operated with the following numerical values:

22.5 parts by weight water are added to 15 parts by weight absolutely dry fibres, by the spray nozzles 16, on the conveyor belt 15, so that fibres having a moisture content of 150% are located in the dosing bunker 21. 15.3 parts by weight water are added to 85 parts by weight dry plaster of Paris in the mixer 8, so that plaster of Paris having a moisture content of 18% leaves the mixer 8. However, the plaster of Paris has not yet lost its powder properties due to the addition of water. Above all, the time for which it is capable of being stored is limited, so that rapid further processing must be ensured.

With the data given, the mixture which leaves the mixer 9 for further processing contains 37.8 parts by weight water to 100 parts by weight solid material. 14.45% of this is used up for setting of the moulded plaster part. In the finished product, which now contains 114.45 parts by weight solids, 23.35 parts by weight residual water thus still remain. This is synonymous with a residual moisture content of 20% in the finished product.

In favourable cases, the water content of the fibres can be increased up to a moisture content of 200%. The water content in the plaster may be raised up to approximately 22% in a corresponding manner.

The installation described with reference to FIG. 2 is preferably operated with the following numerical values:

Due to the addition of water, 65 to 95 parts by weight plaster of Paris are given a moisture content of 8 to 12% in the mixer 108. Up to 30 parts by weight additive are mixed in the mixer 133 with such a quantity of water that a moisture content of approximately 10% results. 3 to 7 parts by weight glass fibres naturally without any water content, since glass fibres cannot store any water—are introduced into the mixer 141. Since, in the installation according to FIG. 2, the supply of water by way of the fibres is missing, at the time of moulding, further water is preferably sprayed thereon. The moisture content, which is to be attributed to this subsequent spraying, lies between approximately 7 and 15%.

In all cases, if necessary, desired additives are dissolved in the water in the container 105 and added with the latter.

In the embodiment described above with reference to FIG. 1, the waste paper was moistened with water. This moistening can take place in many cases completely or partly by moistening with slurries containing fibres, as they occur for example in the cellulose industry. This simultaneously makes a contribution to the environmentally friendly disposal of these slurries.

I claim:

1. Method for the manufacture of a moist mixture from plaster of Paris and fibres as an initial product in the manufacture of fibre-reinforced moulded plaster bodies, in which fluid plaster of Paris, fibres and water are mixed homogeneously, wherein before mixing with the fibres, a quantity of water is added to the plaster of Paris which leads to a moisture content of between 5 and 22%.

2. Method according to claim 1 wherein the moisture content of the plaster of Paris is adjusted to approximately 18%.

3. Method according to claim 1 wherein the mixing of plaster of Paris and water takes place continuously in a high-speed, low-volume mixer (8; 108).

4. Method according to claim 1 wherein the pre-moistened plaster of Paris is mixed with the fibres within five minutes at the maximum.

5. Method according to claim 4, wherein together with the fibres, further additives are mixed with the pre-moistened plaster of Paris.

6. Method according to claim 5, wherein before mixing with the pre-moistened plaster of Paris, the additives are in turn pre-moistened.

7. Method according to claim 4, wherein the mixing of the pre-moistened plaster of Paris with the fibres takes place continuously in a high-speed, low-volume mixer (9; 141).

8. Method according to claim 7, wherein the mixing takes place in two stages in two continuous mixers, and wherein the first with a somewhat larger volume, operates somewhat more slowly than the second.

9. Method according to claim 1, wherein the fibres are added with a moisture content of up to 200%.

10. Method according to claim 9, wherein the fibres are added with a moisture content of approximately 150%.

11. Method according to claim 10, wherein
a) 15 parts by weight dry fibres are given a moisture content of 150%,
b) 85 parts by weight dry plaster are given a moisture content of 18%, and that the substances pre-moistened in this way are then mixed.

12. Method according to claim 9, wherein the fibres are produced from waste paper, wherein the moistening of the waste paper takes place before shredding.

13. Method according to claim 12, wherein the waste paper takes place after preliminary reduction to approximately the size of postage stamps.

14. Method according to claim 12, wherein the reaction time of the water during moistening of the waste paper amounts to at least one minute.

15. Method according to claim 1, wherein the supply of water to the respective dry substances at the time of moistening is controlled by a control circuit (4, 17; 104, 134), which monitors the quantity of dry substance supplied per unit time and doses the water according to the pre-set, desired moisture content.

16. Method according to claim 12, wherein moistening of the waste paper takes place at least partly by waste slurries having a high fibre content.

17. Method according to claim 16, wherein with respect to the dry substance—slurries having a fibre content of up to 50% are added to the waste paper.

* * * * *